W. H. DEHN.
ANTISCALD VALVE.
APPLICATION FILED NOV. 9, 1908.

967,339.

Patented Aug. 16, 1910.

2 SHEETS—SHEET 1.

Witnesses:
H. J. Gittins
B. C. Brown

Inventor:
William H. Dehn
by Lynch & Dorer
Attorneys.

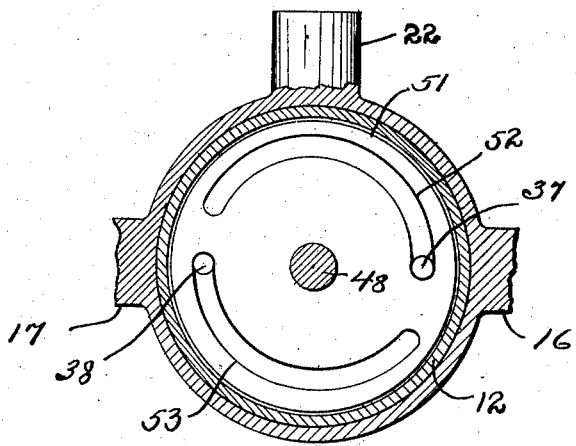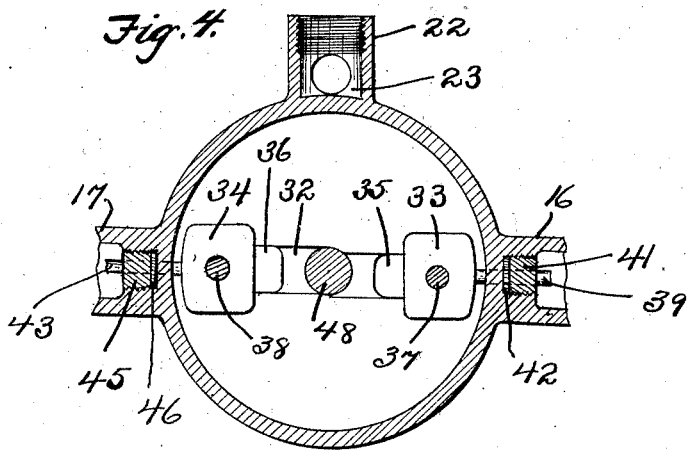

UNITED STATES PATENT OFFICE.

WILLIAM H. DEHN, OF CLEVELAND, OHIO, ASSIGNOR TO SANITARY COMPANY, OF CLEVELAND, OHIO, A CORPORATION OF OHIO.

ANTISCALD-VALVE.

967,339.

Specification of Letters Patent.   Patented Aug. 16, 1910.

Application filed November 9, 1908.   Serial No. 461,602.

*To all whom it may concern:*

Be it known that I, WILLIAM H. DEHN, a citizen of the United States of America, residing at Cleveland, in the county of Cuyahoga and State of Ohio, have invented certain new and useful Improvements in Antiscald-Valves; and I hereby declare the following to be a full, clear, and exact description of the invention, such as will enable others skilled in the art to which it pertains to make and use the same.

This invention relates to improvements in water supply valves and particularly to the type of valves known as mixing or "non-scald" valves.

The object of the invention is to provide a valve which is adapted to be connected to both hot and cold water supply, and having a construction and arrangement such that either hot or cold water may be drawn separately or a mixture of the two can be obtained in such proportions as give the temperature desired.

More specifically the invention relates to a valve having a casing which is provided with a mixing chamber having inlet openings for both hot and cold water, and with an outlet opening through which water of any desired temperature may be drawn. The supply of water through the hot and cold water inlet openings is controlled by two movable valve members which may be shifted by operating mechanism preferably located in a second compartment or chamber of the casing, and by a single stem and handle, the position of which determines the temperature of water which is drawn from the chamber.

My invention may be further briefly summarized as consisting in certain novel details of construction and combinations and arrangements of parts described in the specification, set forth in the appended claims and illustrated in the accompanying drawings.

For a better understanding of my invention reference is had to the accompanying drawings, in which—

Figure 1:
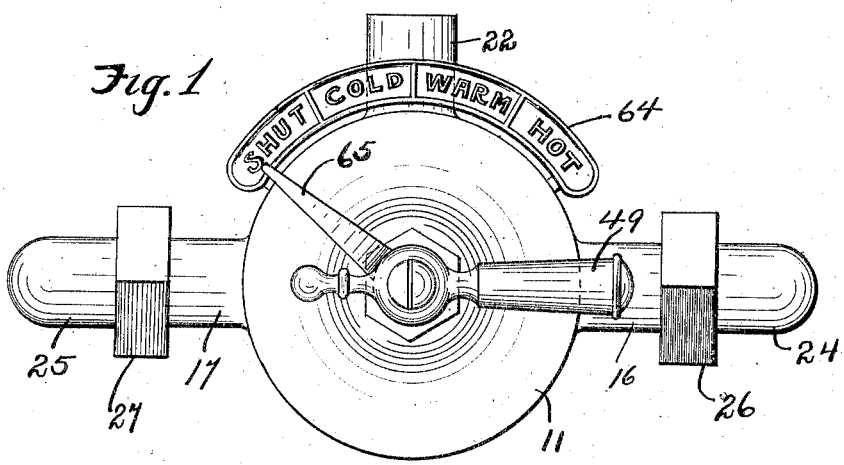
Figure 2:
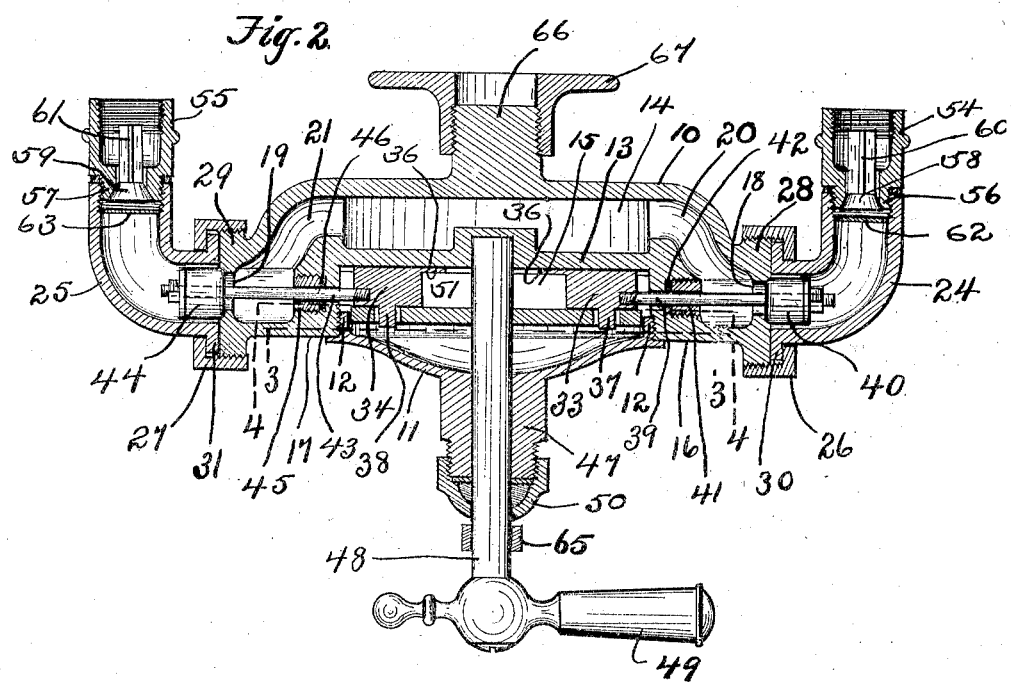

Figure 1 is a front elevation of a valve constructed in accordance with my invention. Fig. 2 is a horizontal section of the same. Fig. 3 is a vertical section on line 3—3, Fig. 2. Fig. 4 is a vertical section on line 4—4, Fig. 2.

Referring now to the figures of the drawing, 10 represents the main casing of the valve, the general shape of which is annular and which is provided with a removable cover 11 having a threaded flange 12 which is screwed into the front portion of the casing. The casing is provided on the interior with a vertical wall or partition 13 which divides the same into two compartments 14 and 15, the chamber 14 constituting the mixing chamber and the chamber 15 which is formed by the partition 13 and removable cover 11 being adapted to receive and contain the main parts of the valve operating mechanism. As will appear later, the water which passes through the valve does not enter this chamber 15, and consequently the valve operating mechanism is entirely protected from the action of the water passing through the valve and therefore no grit or other foreign substances can be deposited on the working parts so as to cause undue wear thereof. At the same time a lubricant can be always kept on the operating mechanism without danger of impregnating the water flowing through the valve.

The chamber is provided preferably at opposite sides with two extensions or projections 16 and 17. At the outer or free ends of the extensions 16 and 17 respectively are valve seats and valve inlet openings 18 and 19, said inlet openings communicating with the mixing chamber by means of passageways 20 and 21 which are preferably cored in the extensions or projections. Intermediate the two extensions 16 and 17 through which the hot and cold water is supplied to the mixing chamber, and in this case at the top of the chamber, is a third extension or projection 22 having a passageway or opening 23 which communicates with the mixing chamber and constitutes the outlet passageway for the valve. This extension 22 is threaded so that a pipe may be readily connected thereto for conveying the water to any suitable sink, bowl or other device of a similar nature. Short pipes or nipples 24 and 25, in the present case in the form of elbows, are connected to the extensions 16 and 17 by means of unions 26 and 27. As here shown the outer ends of the extensions are provided with external flanges 28 and 29 threaded on the exterior, and the adjacent ends of the elbows are provided with unthreaded external flanges which engage or abut against the outer faces of the extensions. The parts are held in this position by the unions with the openings or passageways of the elbows located centrally or in line with the valve seats and valve openings at the outer ends of the extensions, the unions having threaded portions which engage the threaded flanges of the extensions, and inwardly extending flanges 30 and 31 which engage the external flanges of the elbows. By means of these unions and with the construction shown, the elbows can be arranged at any desired angle and the joints or connections can be tightened without a removal or displacing of any parts being necessary.

The mechanism for controlling the valve openings which communicate with the mixing chamber will now be explained. The vertical wall or partition 13 is provided on its front face with a transverse slot or guideway 32 which is in line with the two extensions 16 and 17, and which receives for sliding movement, two valve operating blocks 33 and 34 having respectively tongues 35 and 36 which engage the guideway. These two blocks are provided respectively on their front faces with studs 37 and 38, the purpose of which will be referred to later. Secured to the block 33, preferably by being screwed therein, is a valve stem 39 which extends outwardly through the wall of the chamber 15 and the extension 16, and through the valve opening 18 at its outer end, and is provided at its outer end with a movable valve member 40 which is adapted to engage the valve seat at the outer end of the extension 16, and to be moved outward into the elbow 24 to permit water to flow through the valve opening into the mixing chamber 14. A suitably threaded plug 41 surrounds the stem 39 and is secured in a threaded opening in the wall of the chamber so as to hold in position packing 42 which prevents the leakage of water from the passageway 20 into the chamber 15. In a similar manner there is secured to the block 34, a valve stem 43 which extends outwardly in the opposite direction with respect to the stem 39, and is provided at its outer end with a movable valve member 44 which is adapted to engage the valve seat at the outer end of the extension 17 and to control the water which is adapted to be supplied through the elbow 25 and passageway 21 to the mixing chamber 14. This stem 43 is also surrounded by a threaded plug 45 seated in a threaded opening in the wall of the chamber and by packing 46 which prevents the leakage of water from the passageway 21 into the chamber 15.

Extending through the cover 11 and having a bearing in an outwardly projecting boss or lug 47 of the cover and having its inner end journaled in the partition 13 is an operating rod 48 provided at its outer end with a suitable handle 49 adapted to be turned by hand to operate the valve. The outer end of the boss 47 is threaded and is provided with the usual packing gland 50 for preventing the leakage of water about the rod 48.

Secured to the rod 48 on the interior of the chamber 15 is a circular disk 51 provided with two curved slots 52 and 53 shown most clearly in Fig. 3, which slots receive respectively the forwardly projecting studs or lugs 37 and 38 on the valve controlling blocks 33 and 34. These slots are so shaped that when the handle is turned from its normal position or from the position which it occupies when both the inlet or valve openings are closed, the movable valve member controlling the supply of cold water will be first shifted admitting cold water to the chamber 14; then if the handle is shifted farther in the same direction, the movable valve member controlling the supply of hot water will be also shifted so that both hot and cold water will enter the mixing chamber and will pass outward through the outlet passageway 23; and if the handle is shifted still farther in the same direction, the valve member controlling the cold water will be returned to its closed position and the valve member controlling the supply of hot water will be shifted to its full open position so that hot water alone will be supplied to the chamber 14. To accomplish this result, each of the two slots is made concentric with respect to the center of the disk for a portion of its length and eccentric for other portion or portions of its length.

By referring particularly to Fig. 3 it will be seen that the two lugs or studs 37 and 38 are at opposite ends of the two slots respectively, and when the disk is in position such that these studs and slots have the relative position here shown, both movable valve members 40 and 44 will be on their respective valve seats and the supply or flow of water will be entirely shut off. It will be seen that the portion of the slot 52 at the right side of the disk, as shown in Fig. 3, or the portion containing the stud 37, is slightly eccentric with respect to the center of the disk, or curves outwardly from the center. Also the opposite end of the same slot 52 is likewise eccentric, curving from the end away from the center, and the intermediate portion is concentric with the center. The result of this construction is that when the disk is rotated in a clock-wise direction, the stud 37 will be shifted outward a slight distance, by the eccentric portion, will then remain stationary while the concentric portion of the slot passes the stud, and will again be moved inward by the opposite end or rear portion of the slot, which portion is also eccentric. The end of slot 53 which is adjacent or which contains the stud 38, is concentric with respect to the center of the disk, while the opposite end is curved slightly outward or is eccentric, the slot being eccentric for about half its length. The result of this construction is that when the disk is first turned from the position shown in Fig. 3, the stud 38 and block 34 which carries the stud will remain stationary, but during the latter part of the movement of the disk, or as the eccentric portion of the slot passes the stud, the latter will be shifted outward, and when the end of slot 53 on the right side of Fig. 3 reaches the stud 38 the latter will be shifted its full amount from the normal position.

To prevent the water supplied through one elbow backing up into the other elbow in case the hot and cold water pressures are unequal I have provided check valves for the elbows. In the present case the outer ends of the elbows are provided with valve plugs 54 and 55 which are screwed into the outer ends of the elbows, and these plugs are provided at their inner ends with valve seats 56 and 57 adapted to be engaged by movable check valve members 58 and 59 having shanks 60 and 61 which extend loosely into the valve plugs. Any suitable means may be provided for limiting the movement of the valve members 58 and 59 away from their seats, but in the present case I provided for this purpose transverse members 62 and 63 located in the ends of the elbows a short distance from the valve seats. It will be seen that with this construction the check valves may be opened by the pressure of water in the supply pipes so as to permit the flow of hot and cold water into the mixing chamber, but in case the pressure in the mixing chamber exceeds the pressure in either one of the supply pipes, the corresponding check valve will prevent the water backing up into the pipe having the lower pressure.

At the front of the casing there is provided a segment-shaped plate 64 on which are printed the words "Shut," "Cold," "Warm," and "Hot" arranged in the order named, and the operating rod 48 has secured thereto an indicator 65 which is adapted to register with these words when the handle is turned from its normal or closed position to its full open position so as to indicate the position of the movable valve members, or to indicate in a general way the temperature of the water.

The casing is provided on the rear side with a threaded stud 66 adapted to engage a suitable bracket 67 by means of which the valve can be secured in position.

The operation of the device will now be briefly described. When the indicator registers with the word "Shut" and the handle is in the position shown in Fig. 1 the studs on the sliding blocks which control the valves are at opposite ends of the slots in the disk and both the valve openings are closed. As the handle and operating rod are turned so that the indicator points to the word "Cold" the rotation of the disk will cause the stud on the block which operates the cold water valve to move outward since this stud during this movement engages the eccentric portion of the slot, but the stud on the block which controls the hot water valve will not be moved since it engages the concentric portion of the other slot. As the handle is turned farther so that the indicator points to the word "Warm" the stud which controls the hot water valve as well as the cold water valve will be open permitting both hot and cold water to enter the mixing chamber. As the operating handle is moved still farther, the stud on the block controlling the cold water valve will gradually move inward while the stud on the block controlling the hot water valve will move outward still farther, and when the handle is moved to a position such that the indicator registers with the word "Hot" the valve controlling the cold water will be closed and the valve controlling the hot water will be in full open position. When the handle is in this position hot water alone will be admitted to the mixing chamber.

I do not desire to be confined to the exact details shown, but aim in my claims to cover all modifications which do not involve a departure from the spirit and scope of my invention.

What I claim is:—

1. In a mixing valve, in combination, a casing having a partition dividing the same into two main compartments or chambers, one of which constitutes the mixing chamber and having projections or extensions, each of said extensions being provided at its outer end with a valve seat and with a valve opening which communicates with the mixing chamber, said valve openings being adapted to supply hot and cold water respectively, movable valve members arranged to engage said valve seats and to control the supply of hot and cold water to said mixing chamber, and means for shifting said valve members comprising a rotatable rod or stem projecting from said casing, a rotatable disk secured to said rod in said second compartment, said disk having two slots, each provided with portions eccentric and concentric with respect to the center of the disk, said partition having on one side a guide-way, valve operating blocks engaging said guide-way and having portions engaging respectively the slots of said disks, said blocks being connected respectively to said movable valve members.

2. In combination, in a mixing valve, a casing having a mixing chamber provided with valve openings for the supply of hot and cold water respectively and with an outlet opening, movable valve members for said valve openings, and means for shifting said valve members comprising a rotatable rod or stem projecting from said casing, a disk secured to said rod or stem, said disk having two slots, one of which slots is eccentric at both ends and concentric at its middle portion with respect to the center of the disk and the other slot is eccentric from one end thereof toward the middle and concentric from the other end toward the middle portion thereof with respect to the center of the disk, and movable members engaging said slots and connected respectively with said valve members.

3. In a mixing valve, in combination, a casing having a mixing chamber provided with inlet or valve openings for the supply of hot and cold water respectively and with an outlet opening, movable valve members controlling the supply of water through said valve openings, said valve members having inwardly projecting valve stems, and means for shifting said valve members comprising a rotatable rod projecting from the casing, said rod having a rotatable disk, provided with two slots, one of which slots is eccentric at both ends and concentric at its middle portion with respect to the center of the disk and the other slot is eccentric from one end thereof toward the middle and concentric from the other end toward the middle portion thereof with respect to the center of the disk and devices arranged to slide inward and outward, said devices being connected to said inwardly extending valve stems and engaging respectively the slots of said rotatable disk.

4. In combination, in a mixing valve, a casing divided into two main compartments or chambers, one of said chambers constituting a mixing chamber and being provided with valve openings for the supply of hot and cold water respectively and with an outlet opening, movable valve members coöperating with said valve openings, so as to control the supply of hot and cold water, said valve members having inwardly projecting valve stems, and means for shifting said valve members comprising a rotatable rod projecting from the casing, a rotatable disk secured to said stem, said disk having two slots, one of which slots is eccentric at both ends and concentric at its middle portion with respect to the center of the disk and the other slot is eccentric from one end thereof toward the middle portion thereof with respect to the center of the disk and valve operating blocks mounted for sliding movement, said blocks having portions engaging the slots of the disk and being connected to the two valve stems respectively, said disk and sliding blocks being in the other of said chambers.

In testimony whereof, I sign the foregoing specification, in the presence of two witnesses.

WILLIAM H. DEHN.

Witnesses:
VICTOR G. LYNCH,
N. L. McDONNELL.